US012792283B2

(12) United States Patent
Kakitsuba

(10) Patent No.: US 12,792,283 B2
(45) Date of Patent: Nov. 10, 2026

(54) NON-TRANSITORY COMPUTER-READABLE RECORDING MEDIUM, INFORMATION PROCESSING APPARATUS AND PRINTING METHOD

(71) Applicant: BROTHER KOGYO KABUSHIKI KAISHA, Nagoya (JP)

(72) Inventor: Ryota Kakitsuba, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 162 days.

(21) Appl. No.: 18/807,072

(22) Filed: Aug. 16, 2024

(65) Prior Publication Data

US 2024/0402963 A1 Dec. 5, 2024

Related U.S. Application Data

(63) Continuation of application No. 18/146,069, filed on Dec. 23, 2022, now Pat. No. 12,118,256, which is a
(Continued)

(30) Foreign Application Priority Data

Mar. 27, 2019 (JP) ................................ 2019-061740

(51) Int. Cl.
*G06F 3/12* (2006.01)

(52) U.S. Cl.
CPC .......... *G06F 3/1259* (2013.01); *G06F 3/1206* (2013.01); *G06F 3/121* (2013.01);
(Continued)

(58) Field of Classification Search
None
See application file for complete search history.

(56) References Cited

U.S. PATENT DOCUMENTS 8,314,950 B2 11/2012 Xiao
8,625,117 B2 1/2014 Miyata
(Continued)

FOREIGN PATENT DOCUMENTS

CN 1581056 A 2/2005
CN 1891475 A 1/2007
(Continued)

OTHER PUBLICATIONS

International Search Report and Written Opinion dated May 19, 2020 of the International Searching Authority issued in the PCT application No. PCT/JP2020/006089.
(Continued)

*Primary Examiner* — Miya J Cato
(74) *Attorney, Agent, or Firm* — Scully, Scott, Murphy & Presser, P. C.

(57) ABSTRACT

When a general-use printing program receives a print instruction to cause a printer to execute printing of an image, a supporting program obtains status information of the printer from the printer and determines, based on the status information, whether a display condition is satisfied. The display condition is a condition to display a message based on the status information. When it is determined that the display condition is satisfied, the supporting program display the massage on a UI of a PC.

10 Claims, 6 Drawing Sheets

Related U.S. Application Data continuation of application No. 17/496,248, filed on Oct. 7, 2021, now Pat. No. 11,537,341, which is a continuation of application No. 16/795,694, filed on Feb. 20, 2020, now Pat. No. 11,144,265.

(52) U.S. Cl.
CPC .......... *G06F 3/1211* (2013.01); *G06F 3/1228* (2013.01); *G06F 3/1231* (2013.01); *G06F 3/1255* (2013.01); *G06F 3/1274* (2013.01); *G06F 3/1293* (2013.01)

(56) References Cited

U.S. PATENT DOCUMENTS

| | | | |
|---|---|---|---|
| 11,537,341 | B2 | 12/2022 | Kakitsuba |
| 2002/0152430 | A1 | 10/2002 | Akasaka et al. |
| 2004/0101336 | A1 | 5/2004 | Azami |
| 2004/0212818 | A1 | 10/2004 | Harada |
| 2005/0030334 | A1 | 2/2005 | Kai et al. |
| 2006/0082802 | A1* | 4/2006 | Furuya .............. G06K 15/1809 358/1.13 |
| 2007/0008349 | A1 | 1/2007 | Imoto |
| 2010/0188680 | A1 | 7/2010 | Xiao |
| 2010/0262965 | A1 | 10/2010 | Miyata |
| 2011/0194140 | A1 | 8/2011 | Sweet et al. |
| 2011/0292445 | A1 | 12/2011 | Kato |
| 2012/0002222 | A1 | 1/2012 | Ohara |
| 2012/0050784 | A1 | 3/2012 | Kawaura |
| 2013/0063776 | A1 | 3/2013 | Kishida |
| 2017/0160997 | A1 | 6/2017 | Morita et al. |
| 2017/0223210 | A1 | 8/2017 | Yamada |
| 2017/0242639 | A1 | 8/2017 | Kitagawa et al. |
| 2017/0318167 | A1 | 11/2017 | Shimizu et al. |
| 2017/0339735 | A1 | 11/2017 | Kawaguchi |
| 2020/0004478 | A1 | 1/2020 | Saito |

FOREIGN PATENT DOCUMENTS

| | | | |
|---|---|---|---|
| CN | 102999304 | A | 3/2013 |
| CN | 107038000 | A | 8/2017 |
| JP | H0930084 | A | 2/1997 |
| JP | 2000267900 | A | 9/2000 |
| JP | 2001134388 | A | 5/2001 |
| JP | 2003320736 | A | 11/2003 |
| JP | 2004086254 | A | 3/2004 |
| JP | 2007015225 | A | 1/2007 |
| JP | 2007087404 | A | 4/2007 |
| JP | 2012014634 | A | 1/2012 |
| JP | 2012053559 | A | 3/2012 |
| JP | 2012185742 | A | 9/2012 |
| JP | 2016110208 | A | 6/2016 |
| JP | 2017129961 | A | 7/2017 |
| JP | 2017134718 | A | 8/2017 |
| JP | 2017151564 | A | 8/2017 |
| JP | 2019046061 | A | 3/2019 |

OTHER PUBLICATIONS

Office Action dated Sep. 24, 2020 received in U.S. Appl. No. 16/795,694.
Office Action dated Feb. 9, 2021 received in U.S. Appl. No. 16/795,694.
Notice of Allowance dated Jun. 14, 2021 received in U.S. Appl. No. 16/795,694.
Office Action dated May 11, 2022 received in U.S. Appl. No. 17/496,248.
Notice of Allowance dated Aug. 25, 2022 received in U.S. Appl. No. 17/496,248.
Notice of Reasons for Refusal dated Oct. 4, 2022 received in Japanese Patent Application No. 2019-061740.
First Office Action dated Dec. 5, 2023 received in Chinese Patent Application No. 202080021950.6.
Office Action dated Jan. 19, 2024 received in U.S. Appl. No. 18/146,069.
Notice of Allowance dated May 2, 2024 received in U.S. Appl. No. 18/146,069.
Second Office Action dated May 24, 2024 received in Chinese Patent Application No. 202080021950.6.
Notice of Reasons for Refusal dated Dec. 10, 2024 received in Japanese Patent Application No. 2024-027277.
Third Office Action dated Aug. 14, 2024 received in Chinese Patent Application No. 202080021950.6.

* cited by examiner

PRINT DATA

[PRINTER IDENTIFYING INFORMATION]
NAME: PRINTER A
IDENTIFYING INFORMATION: aaa1

[PRINTING IMAGE DATA]

[PRINT PARAMETER]
SHEET FEED TRAY: TRAY 1
SHEET SIZE: A4
SHEET TYPE: STANDARD PAPER
COLOR/MONOCHROMATIC PRINT: COLOR
STAPLER: ON

FIG. 3A

CURRENT STATUS INFORMATION

[STATUS INFORMATION]
STATUS: PAUSING PRINTING
ERROR INFORMATION: OUT OF PAPER
PROGRESS STATUS: 51 SHEETS/100 SHEETS
COMMUNICATING STATE: ONLINE
COLORANT(BLACK): AVAILABLE
COLORANT(CYAN): AVAILABLE
COLORANT(MAGENTA): AVAILABLE
COLORANT(YELLOW): AVAILABLE
STAPLER: PRESENCE
STAPLER NEEDLE: AVAILABLE
FREE SPACE FOR ACCUMULATING PRINT JOB: 100%

[SETTING INFORMATION]
CANCELLING OPERATION: NO
SHEET SETTING (TRAY 1): A4 STANDARD PAPER
SHEET SETTING (TRAY 2): A3 STANDARD PAPER
COLOR/MONOCHROMATIC PRINT: COLOR

FIG. 3B

NON-TRANSITORY COMPUTER-READABLE RECORDING MEDIUM, INFORMATION PROCESSING APPARATUS AND PRINTING METHOD

CROSS-REFERENCE TO RELATED APPLICATIONS

This application is a continuation application of U.S. patent application Ser. No. 18/146,069 filed on Dec. 23, 2022 which is a continuation application of U.S. patent application Ser. No. 17/496,248 filed on Oct. 7, 2021, now U.S. Pat. No. 11,537,341 issued on Dec. 27, 2022, which is a continuation application of U.S. patent application Ser. No. 16/795,694 filed on Feb. 20, 2020, now U.S. Pat. No. 11,144,265 issued on Oct. 12, 2021 which claims priority under 35 U.S.C. § 119 from Japanese Patent Application No. 2019-061740 filed on Mar. 27, 2019. The entire subject matter of the applications are incorporated herein by reference.

RELATED ART

There has been widely known a technique to control a printer from an information processing apparatus such as a personal computer, a configuration of installing a printer driver in the information processing apparatus, generating print data using the printer driver and transmitting the print data to the printer. The printer driver is provided by a manufacturer of the printer and is adapted to various functions the printer has, and thus can make full use of the printer.

SUMMARY

Recently, a technique of controlling a printer using a general-use printing program which is standardly implemented in an operating system (OS), without using the above-mentioned printer driver, has been in practical use. According to such a technique, when the OS detects a printer, the OS associates the printer with the OS-standard printing program. Thereafter, it becomes possible that, when the OS receives a print instruction corresponding to the printer, printing is executed using the OS-standard general-use printing program, without using the printer driver.

Even in the above-mentioned printing using the OS-standard general-use printing program, as with the printing using the printer driver, a process corresponding to a print instruction output by the application terminates when print data is accumulated in a print queue of the OS. In order for the user to thereafter obtain information concerning the print data, the user needs to operate a user interface of the OS which is burdensome for the user.

The present specification discloses a technique in which, in an information processing apparatus in which an OS-standard general-use printing program is implemented, the user can easily obtain information concerning processes that are based on the print instruction.

According to aspects of the present disclosure, there is provided a non-transitory computer-readable recording medium for an information processing apparatus, the information processing apparatus having a controller, a general-use printing program being implemented in an operating system of the information processing apparatus, the recording medium containing computer-executable programs realizing a supporting program corresponding to a printer connectable to the information processing apparatus. The supporting program causing, when executed by the controller, the information processing apparatus to perform an obtaining process, a determining process and a displaying process in response to the general-use printing program receiving a print instruction to cause the printer to execute printing of an image. The obtaining process is a process of obtaining information of the printer from the printer through a communication interface of the information processing apparatus. The determining process is a process of determining, based on the obtained information of the printer, whether a display condition is satisfied, the display condition being a condition to output a message regarding the information. The displaying process of a process of displaying the message on a display of the information processing apparatus when it is determined that the display condition is satisfied in the determining process.

BRIEF DESCRIPTION OF THE ACCOMPANYING DRAWINGS

FIGS. 3A-3B are diagrams showing examples of data structures, and FIG. 3A shows print data and FIG. 3B shows current state information.

DETAILED DESCRIPTION OF THE EMBODIMENT

Hereinafter, referring to the accompanying drawings, a print system using programs according to the embodiment will be described in detail. The present embodiment shows a concrete example of the print system including a personal computer (hereinafter, referred to as a "PC") and a printer.

Figure 1:
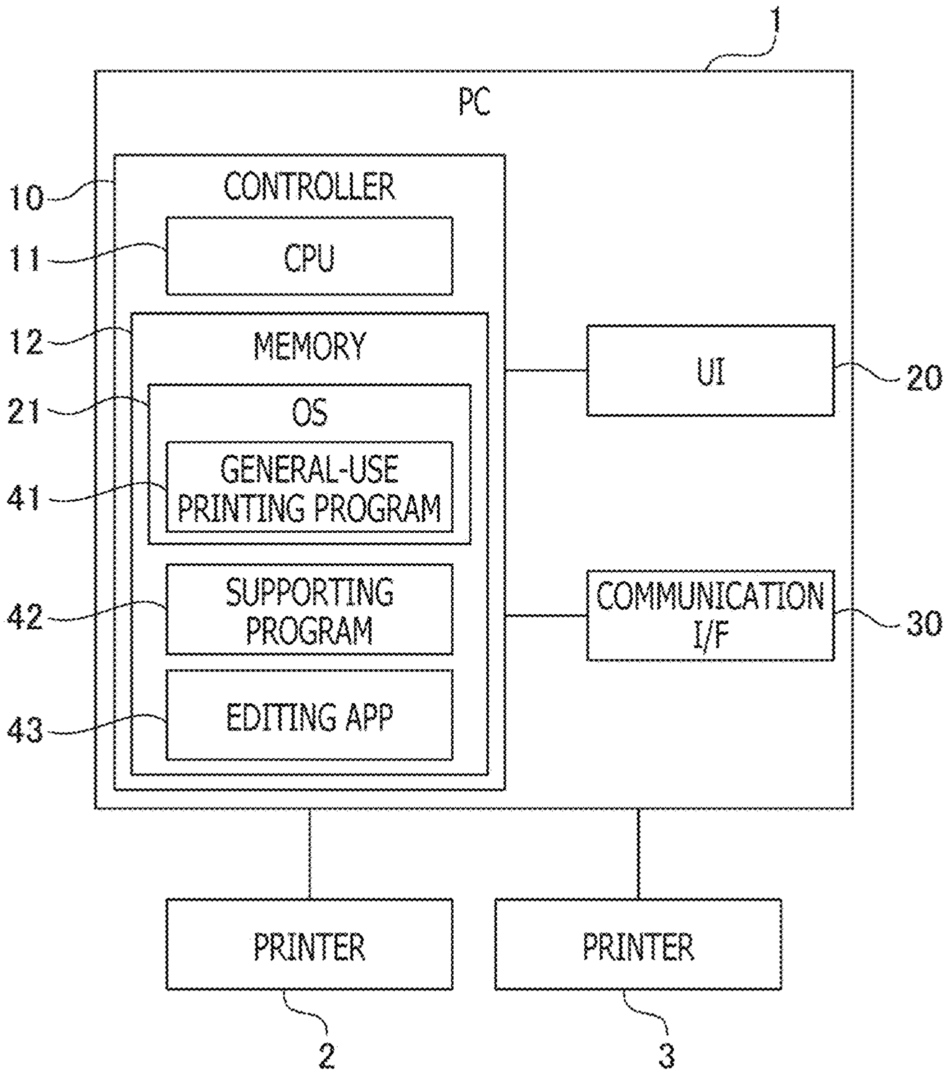
FIG. 1 is a block diagram showing an electrical configuration of a print system.

An example of a configuration of a print system in which programs according to the embodiment are executed is shown in FIG. 1. The system shown in FIG. 1 includes a PC 1, a printer 2 and a printer 3. The PC 1 is an example of an information processing apparatus. The printer 2 and the printer 3 are devices having a printing function and are configured to communicate with the PC 1 through a local communication or a network communication, it is noted that a plurality of printers 2 may be connected to the PC 1.

As shown in FIG. 1, the PC 1 includes a controller 10, a user interface (hereinafter, referred to as a "UI") 20 and a communication interface (hereinafter, referred to as a "communication I/F") 30. The UI 20 and the communication I/F 30 are electrically connected to the controller 10.

The UI 20 includes hardware configured to display various pieces of information and receive user's input of instructions. The UI 20 may include a touch panel having both an input receiving function and a displaying function, or a combination of a display having a displaying function and a keyboard and/or a mouse having an input receiving function. The UI 20 is an example of a display device.

The communication I/F 30 includes hardware configured to communicate with the printer 2 and a hardware configured to access the Internet. The communication I/F 30 may include multiple interfaces respectively employing different communication methods. Examples of the communication methods may include the network communication, a USB communication and the like. Further, the communication methods may be wired or wireless.

The controller 10 includes a CPU 11 and a memory 12. The CPU 11 is an example of a computer. The memory 12 includes a ROM, a RAM, a non-volatile memory and a buffer of the CPU 11, and stores various application programs (hereinafter, referred to as "APP's") and various pieces of data. According to the present specification, details of the memories could be ignored and any memory having a suitable function could be employed as the memory 12. The CPU 11 executes various processes in accordance with programs retrieved from the memory 12 or in accordance with user's instructions. It is noted that the controller 10 in FIG. 1 is a collective name including hardware and software used to control the PC 1 and does not necessarily represent a single piece of hardware.

An example of the memory 12 may be a computer-readable storage medium. The computer-readable storage medium is a non-transitory medium. Examples of the non-transitory medium are, besides the above-described memory 12, recording mediums such as a CD-ROM, a DVD-ROM and the like. It is noted that the non-transitory medium is also a tangible medium. In contrast, an electric signal carrying a program, which is being downloaded from a server on the Internet, is a signal medium which is a kind of computer-readable media, but not included in the non-transitory computer-readable medium.

The memory 12 stores, as shown in FIG. 1, the OS 21 implemented with a general-use printing program 41, a supporting program 42 and an editing APP 43. The supporting program 42 is an example of a supporting program. The supporting program 42 is, for example, a hardware support APP (abbreviated as HSA) of which specification is published by Microsoft Corporation. The OS 21 is, for example, Microsoft Windows®, MacOS® or Linux®. It is noted that, in the memory 12, in addition to the data/APP shown in FIG. 1, various pieces of data including information regarding connected device, various programs of browser and the like are stored.

The general-use printing program 41 is an APP to cause various printers such as the printer 2 to execute printing from the PC 1 and is an OS-standard printing program which is implemented in the OS 21 in advance. The general-use printing program 41 according to the present embodiment is configured to generate print data the printer can use for printing based on image data subjected to be printed.

The general-use printing program 41 is a general-purpose APP which can be used for any of a plurality of models of printers supplied by various printer venders. The general-use printing program 41 is configured to cause any of the plurality of models of printers to perform operations which are commonly implemented in the plurality of models of printers. Alternatively, the general-use printing program 41 may be a program supplied from the printer venders to a vender of the OS 21 (e.g., the program may be a kind of printer driver, which is supplied by a printer vender, to be implemented in the OS 21 in advance) so that the general-use printing program 41 is implemented in the OS 21 in advance.

The supporting program 42 is a program which executes processes based on the instruction by the OS 21 in association with the startup of the general-use printing program 41 and an APP which supports controlling of hardware, such as the printer 2, subjected to the instruction. The supporting program 42 is started, for example, by the general-use printing program 41. The supporting program 42 is a program that is prepared by printer venders, such as a vender of the printer 2, for each type of printers. For example, a supporting program 42 for inkjet printers and a supporting program 42 for laser printers are prepared. The supporting program 42 may be prepared not only for each type of printers but also for each model or for each model series of printers.

The vender of the printer registers the supporting program 42 with a platform supplied by the vender of the OS 21 in accordance with a procedure designated by the vender of the OS 21. When a printer 2 is newly connected to the PC 1 and the supporting program 42 corresponding to the printer 2 is registered with the platform, the OS 21 downloads the supporting program 42 from a server in which the supporting program 42 is stored and implements the same in the PC 1.

Then, the OS 21 associates identification information of the implemented supporting program 42 with the printer information of the newly connected printer 2 and stores the same in the memory 12. In the PC 1 to which a plurality of models of printers are connected, a plurality of supporting programs respectively corresponding to a plurality of types of the plurality of models are implemented in the OS 21, and information associating the plurality of printers with the plurality of supporting programs is stored in the memory 12. That is, in the memory 12, as the printer information for each of the printers connected to the PC 1, information on the supporting program 42 corresponding to each printer is stored in addition to the model information and the access information of each printer.

The editing APP is, for example, an APP for generating and/or editing image data and document data. Examples of the editing APP 43 are Microsoft Word® and Power Point®. Further, the editing APP 43 may be an APP provided by the vender of the printer 2 and/or printer 3. The editing APP 43 is configured to receive a user operation including an instruction to cause the printer 2 to perform a particular operation. Specifically, for example, the editing APP 43 receives, through the UI 20, a print instruction which causes the printer 2 to execute printing.

It is noted that processes described below basically indicate processes of the CPU 11 in accordance with instructions described in respective programs such as the supporting program 42. That is, in the following description of the processes and steps, terms "determine," "extract," "select," "calculate," "identify," "obtain," "receive," "control" and the like are those performed by the CPU 11. It is noted that the processes by the CPU 11 include controlling of hardware using an API of the OS 21. In the following description, operations of the programs will be described with omitting the detailed description of the OS 21. That is, in the following description, a description "a program B controls hardware C" may be interpreted to "a program B uses the API of the OS 21 to control the hardware C." Further, a process of the CPU 11 in accordance with the instruction described in a program may be described in a simplified manner. For example, the name of the program is omitted and simply described such that "the CPU 11 performs." Further, a process of the CPU 11 in accordance with an instruction described in the program may be described in a simplified manner such that "the program A performs" with omitting the term "CPU."

It is noted that the term "obtain" is used to mean that a request is not necessarily be made. That is, a process of the CPU 11 to receive data without any request is included within a concept that "the CPU 11 obtains data." Further, the term “data” in the present specification is used to mean a bit array readable by a computer. Multiple pieces of data having different formats but substantially the same contents will be treated as the same data. So is the information in the present specification. It is noted that terms “request” and “instruct” represent concepts of outputting information indicating something is requested and information indicating something is instructed, respectively. It is also noted that information representing something is requested or something is instructed may be simply referred to by terms “request” or “instruct.”

Further, a process of the CPU 11 to determine whether or not information A indicates an event B may be described conceptually such that “the CPU 11 determines whether event B or not based on information A.” Furthermore, a process of the CPU 11 to determine whether information indicates event B or event C may be described conceptually such that “the CPU 11 determines whether event B or event C based on information A.”

Next, a configuration of the supporting program 42 and a printing procedure including processes based on the supporting programs 42 of the present embodiment will be generally described with reference to FIGS. 2-6. It is noted that, in FIGS. 2, 5 and 6, same numerals are used for common processes.

The supporting program 42 is a program that the general-use printing program 41 instructs to execute when a print instruction to execute printing using the general-use printing program 41 is received through the editing APP 43 or the like in a state where a printer corresponding to the supporting program 42 is designated. In the following description, a case where the PC 1 receives, through the UI 20 (e.g., with the editing APP 43), an instruction to execute printing with the printer 2 through the general-use printing program 41 in a state where image data subjected to be printed is designated and the supporting program 42 corresponding to a type of a model of the printer 2 is implemented in the PC 1 will be described.

Figure 2:
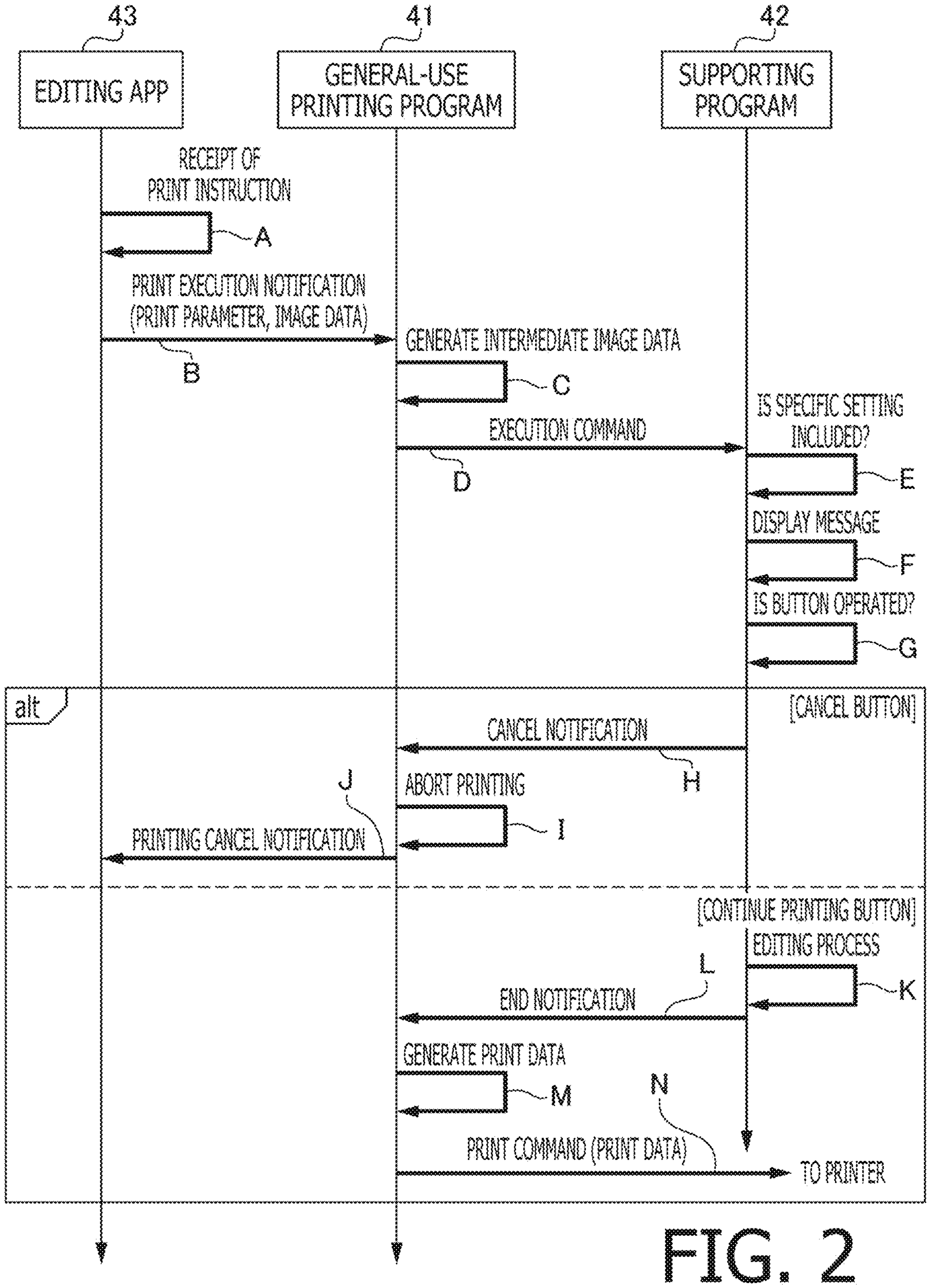
FIG. 2 is a sequential chart showing an example of an order of operations by respective programs.

As shown in FIG. 2, firstly, the editing APP 43 receives, through the UI 20, designation of an image subjected to be printed and an input of an instruction to execute printing (arrow A). An image that the editing APP 43 displays is an example of an image subjected to be printed. The editing APP 43 displays, for example, documents edited with the editing APP 43 or pictures and the like read with the editing APP 43 as the image. Then, the editing APP 43 which received the print instruction delivers a print execution notification indicating contents of received print instruction to the OS 21. It is noted that, in FIG. 2 and in FIGS. 5 and 6 which will be described later, operations of the OS 21 are omitted.

When the print execution notification indicating usage of the general-use printing program 41 is received, the OS 21 activates the general-use printing program 41 and delivers the print execution notification to the general-use printing program 41 (arrow B). The general-use printing program 41 can obtain, from the print execution notification, various pieces of information included in the print instruction such as information indicating a printer to be caused to execute printing, print queue information for identifying a print queue, information indicating print parameters set with the APP, information indicating image data subjected to be printed, and information for identifying a user who instructed to execute printing. It is noted that, as will be described later, these pieces of information can be used in the supporting program 42 as well.

The general-use printing program 41 generates intermediate image data by converting a format of the image data included in the print execution notification to a format of the intermediate image data and generates a print job including the intermediate image data (arrow C). There are various types of image data as the image data included in the editing APP 43, and the general-use printing program 41 converts the received image data to the intermediate image data that is suitable for the generation of the print data. It is noted that, if the image data included in the print execution notification is suitable for the generation of the print data, the intermediate image data generation process may be omitted and the image data may be directly used as the intermediate image data. The intermediate image data is, for example, XPS format data.

Further, the general-use printing program 41 identifies, based on the information included in the print execution notification, a printer designated as a device to be caused to execute printing. For example, when the printer 2 is designated as the device to be caused to execute printing, the general-use printing program 41 identifies the model of the printer 2 based on the model information of the printer included in the printer information stored in the memory 12. Then, since the supporting program 42 corresponding to the printer 2 designated by the print instruction is stored in the memory 12, the general-use printing program 41 activates the supporting program 42 prior to starting generation of the print data by the general-use printing program 41 by outputting an execution command for causing the supporting program 42 to execute processes (arrow D). It is noted that the general-use printing program 41 may activate the supporting program 42 after the general-use printing program 41 generates the print data.

In response to the execution command, the supporting program 42 determines whether one or more specific settings are included in the print parameters (arrow E). The arrow E is an example of a determining process, and a determining condition at the arrow E is an example of a display condition. The print parameters may be print parameters which the general-use printing program 41 obtained from the editing APP 43 and attached to the execution command. Or the print parameters may be print parameters which the supporting program 42 received by, for example, displaying a print parameter editing screen.

The print parameters include general-use parameters, such as a parameter indicating a sheet size, to which the general-use printing program 41 is adapted and intrinsic parameters, such as a parameter indicating a type of sheet, intrinsic to a printer and to which the general-use printing program 41 is not adapted. If the editing APP 43 is not an APP that is provided by a vender of the printer 2, only the general-use parameters will be attached to the execution command. If the editing APP 43 is an APP that is provided by the vender of the printer 2, it is possible that the general-use parameters and the intrinsic parameters of the printer 2 will be attached to the execution command. It is noted that, in a case where only the general-use parameters are attached to the execution command, the supporting program 42 may add the intrinsic parameters to the execution command and process the print parameters.

Among the settings by the print parameters, there are settings, such as setting designating a high-quality sheet (e.g., a postcard) as the type of sheet, which are preferable to be confirmed by the user before executing printing. Therefore, the supporting program 42 designates, among the settings that can be set by the print parameters, setting to be confirmed by the user before executing printing as specific setting.

For example, if "postcard", being one of the setting of the type of sheet, is designated as the specific setting, the supporting program 42 determines whether a setting value of a print parameter indicating the type of sheet is "postcard" or not. If the setting value of the print parameter indicating the type of sheet is "postcard", the supporting program 42 determines that the settings by the print parameters include the specific setting and displays a message (arrow F). The arrow F is an example of a displaying process.

Figure 4A:
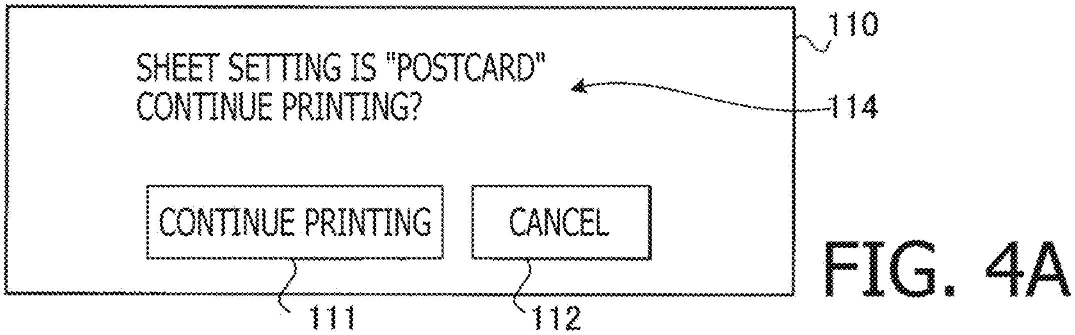
FIGS. 4A-4D are diagrams of a UI showing examples of messages.

Specifically, for example, the supporting program 42 causes the UI 20 to display a dialogue 110 shown in FIG. 4A at arrow F. In the dialogue 110, a confirmation message 114 for letting the user confirm whether the printing on a postcard may be continued to be executed is displayed. In the dialogue 110, a "continue printing" button 111 for instructing to continue printing and a "cancel" button 112 for instructing to cancel printing are also displayed.

If the user operated the "cancel" button 112 (arrow G), the supporting program 42 outputs a cancel notification indicating that printing it to be cancelled to the general-use printing program 41 (arrow H). The general-use printing program 41 aborts the printing in response to the cancel notification (arrow I) and outputs a printing cancel notification indicating that printing has been cancelled to the editing APP 43 (arrow J). It is expected that the user who realized that the specific setting was made as a result of the displaying of the confirmation message 114 will change the setting value and instruct to execute printing again.

It is noted that the change in the setting value may be received through the supporting program 42 or through the editing APP 43. Also, as with a dialogue 120 shown in FIG. 4B which will be described later, a "reset" button 123 may be provided to the dialogue 110 as well and processes similar to those at the arrows R-T and D shown in FIG. 5, which will be described later, may be executed in response to an operation of the "reset" button 123.

On the other hand, when the user operates the "continue printing" button 111 (arrow G), the supporting program 42 executes an editing process for editing the intermediate image data attached to the execution command in accordance with the print parameters (arrow K) and delivers, to the general-use printing program 41, an end notification indicating that the editing process has been finished (arrow L). The general-use printing program 41 generates the print data based on the intermediate image data included in the end notification output from the supporting program 42 (arrow M). That is, the general-use printing program 41 generates the print data while the setting value of the print parameter indicating the type of sheet is set to "postcard". It is noted that the intermediate image data may be the one generated by the general-use printing program 41. The print data generated by the general-use printing program 41 is print data of a format that can be used in printing with various types of printers. The print data is, for example, PWG Raster format data or PDF format data.

It is noted that the supporting program 42 deletes the displayed dialogue 110 in response to the operation of the "continue printing" button 111 or the "cancel" button 112 and terminates the displaying of the message. It is noted that the supporting program 42 may be configured not to display the "continue printing" button 111 or the "cancel" button 112 in the dialogue 110. In that case, for example, the supporting program 42 is configured to terminate the displaying of the message when a particular time period has elapsed and continue printing.

After the generation of the print data, the general-use printing program 41 transmits a print command including the generated print data to the printer 2 (arrow N). It is noted that the supporting program 42 may have functions to process the print data such as an adding function of adding, to the print data, commands for causing the printer 2 to execute functions unique to the printer 2. In this case, the general-use printing program 41 may transmit the processed print data to the printer 2. As shown in FIG. 3A, the print data includes, for example, printer identifying information for identifying a printer which executes the print job, printing image data being data of images to be printed, and the print parameters.

The printer 2 which received the print command executes printing of an image of print data in accordance with the print data attached to the print command. If print data to which commands are attached is received, the printer 2 executes operations indicated by the commands when executing printing. It is noted that, after the process for editing the print data is finished, the supporting program 42 may transmit the print command to the printer 2 through the communication I/F 30 without using the general-use printing program 41.

The above-mentioned processes at the arrows E and F need to be executed only once for one print job. The timings for executing the processes at the arrows E and F are not limited to the above-mentioned timings. Provided that the timings are before the transmission of the print data to the printer 2, the timings may be, for example, after the editing process, before the generation of the print data, or after the generation of the print data. Nonetheless, execution of useless processes for generating print data that will not be printed can be avoided by executing the processes at the arrows E and F before the editing process.

Figure 5:
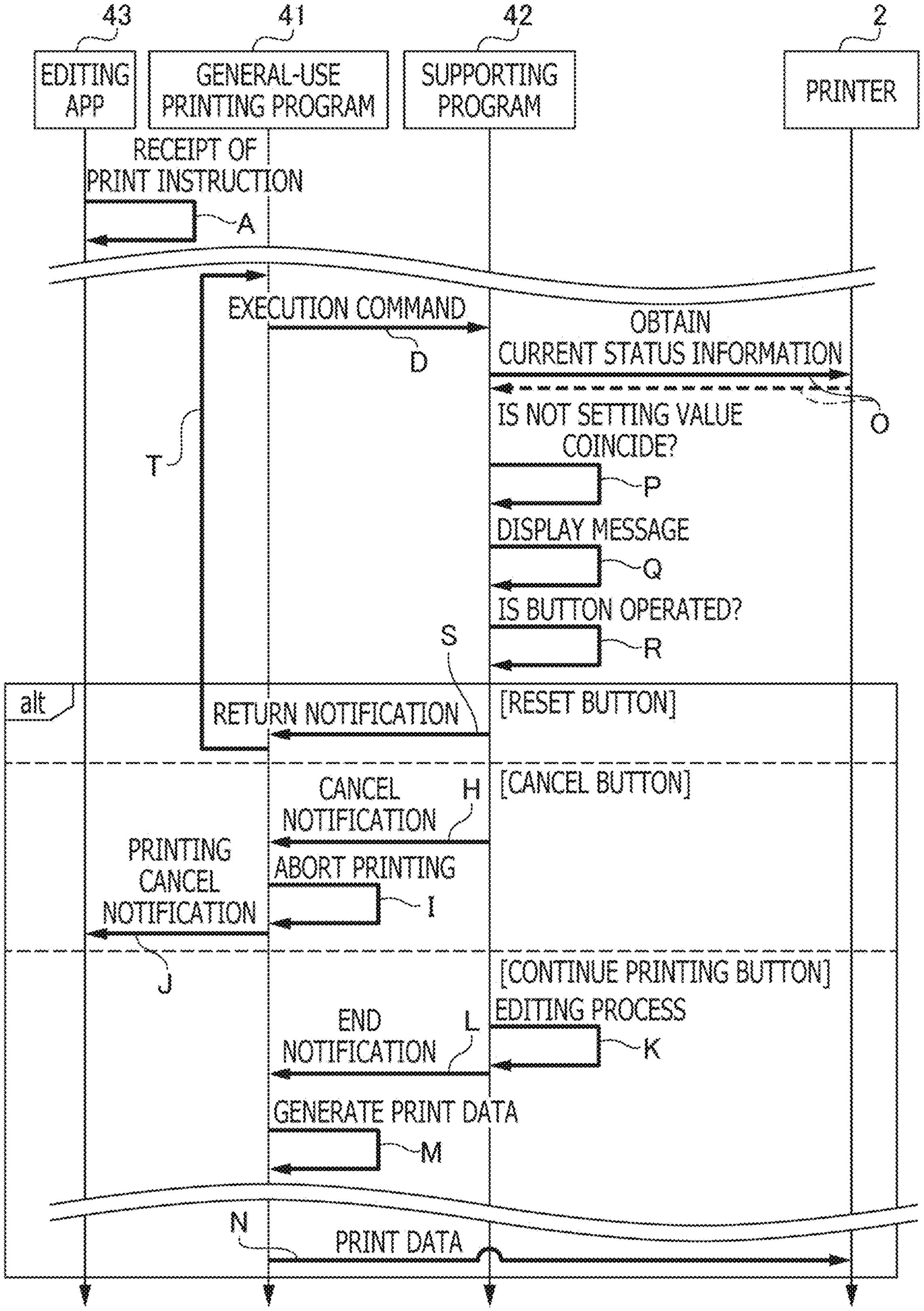
FIG. 5 is a sequential chart showing an example of an order of operations by respective programs.

For example, as shown in FIG. 5, after receiving a print parameter corresponding to the print instruction, the supporting program 42 requests current state information, being information concerning the printer 2, from the printer 2 and obtains the current state information (arrow O). The arrow O is an example of an obtaining process. The print parameters may be received by receiving the print parameters attached to the execution command or by receiving settings of the print parameters through the intermediate image data editing process. It is noted that the supporting program 42 obtains identity information of a printer indicated by the execution command output from the general-use printing program 41 and requests the current state information from a printer indicated by the obtained identity information.

The current state information includes a plurality of pieces of information such as, for example, status information and setting information as shown in FIG. 3B.

The status information is information indicating a state of the printer 2 which executes a print job. The status information includes, for example, information indicating a free space of a memory for accumulating print jobs, job information indicating progress status of the print job, information indicating amounts of remaining colorants, information indicating whether the printer 2 has a finisher, and information indicating whether there remains staple needles for the finisher.

The job information includes information indicating one of "under printing" indicating that printing of a print job is under execution, "finished printing" indicating that printing of a print job has been finished, "pausing printing" indicating that printing of a print job is paused, and "standby" indicating a state of awaiting the finish of printing of another print job. The printer 2 can receive a cancelling operation for cancelling printing through an operation part. In case the printer 2 received the cancelling operation, the job information includes pieces of information indicating "finished printing" and "cancelling operation: YES". On the other hand, in case the printer 2 finished printing without receiving the cancelling operation, the job information does not include information indicating "cancelling operation: YES" but includes information indicating "finished printing".

To the information indicting "pausing printing", information indicating a type of an error such as paper jam, out of paper or running out of colorants is added. When receiving a plurality of pieces of print data, the printer 2 processes the pieces of print data stored in an internal memory in turn. Therefore, states of print jobs to be executed by the printer 2 include a state of being under printing, a state in which printing is finished, and a standby state. The states of print jobs also include errors such as out of paper or paper jam and a state in which printing has been finished due to the cancelling operation. In response to the request from the PC 1, the printer 2 detects its state and returns the current state information.

It is noted that "pausing printing" is an example of status information indicating a status in which a print job corresponding to a print instruction cannot be executed, and "finished printing" is an example of status information indicating a status in which a print job corresponding to a print instruction can be executed.

If the current state information could be received from the printer 2, that is, if the supporting program 42 is possible to communicate with the printer 2, the supporting program 42 stores, in the memory 12, the current state information in which information indicating "online" is added to the status information. The information indicating "online" indicates that the printer 2 can communicate with the PC 1. On the other hand, if the supporting program 42 is impossible to communicate with the printer 2 due to communication error or because the printer 2 is not turned on, the supporting program 42 stores, in the memory 12, the current state information in which information indicating "pausing printing" and information indicating "offline" are added to the status information.

The memory for accumulating print jobs is a storage area for an accumulation printing with the printer 2. To the information indicating a free space of the memory for accumulating print jobs, for example, information indicating "memory is full" is set when there is no free space in the memory for accumulating print jobs, and information indicating an amount of free space in the memory for accumulating print jobs is set when there is a free space in the memory for job accumulation.

The setting information is information including setting values that are set in the printer 2. The printer 2 has an operation part for receiving inputs of various settings. The printer 2 has a function of receiving, through the operation part, for example, inputs of setting value of sheet sizes and sheet types of a sheet to be set in respective trays and a setting value of color/monochromatic printing and storing the setting values in the internal memory. When returning the setting values of the sheet sizes and the sheet types in response to the request from the PC 1, the printer 2 may return information indicating the sheet sizes and the sheet types stored in the internal memory to the PC 1 or, if the printer 2 has a function of detecting the sheet sizes and the sheet types, the printer 2 may return the detection result to the PC 1.

The above-mentioned current state information includes intrinsic information and general-use information. The intrinsic information is information to which the general-use printing program 41 is not adapted, that is, status information and setting information that are intrinsic to the printer 2. Examples of the intrinsic information are information concerning optional units included in the status information such as the information indicating whether there are finishers, whether there remains staple needles and whether stapling is possible; information concerning the memory for accumulating print jobs such as the information indicating "memory is full"; information concerning the cancelling operation on the printer 2; and the setting values of the sheet types included in the setting information.

On the other hand, the general-use information is information that is generally used and to which the general-use printing program 41 is adapted, that is, information that the OS 21 can understand. Examples of the general-use information are the states of a print job, the errors, the communicating states and the amounts of colorants remaining that are included in the status information; and the setting values of the sheet size and the color/monochromatic printing included in the setting information. It is noted that the intrinsic information is an example of first information and the general-use information is an example of second information.

Referring back to FIG. 5, upon storing the current state information obtained from the printer 2 in the memory 12, the supporting program 42 determines whether setting values of the print parameters of a print job corresponding to the print instruction are coincide with setting values indicated by the setting information included in the current state information obtained from the printer 2 and corresponding to the print parameters (arrow P). The arrow P is an example of the determining process, and the determining condition at the arrow P is an example of the display condition.

For example, the supporting program 42 compares the setting values of the print parameters and the setting values indicated by the setting information included in the current state information. For example, if the setting value of the print parameter indicating the sheet type is "glossy paper" and the setting value of the sheet type included in the current state information obtained from the printer 2 is "standard paper", the supporting program 42 determines that the setting values of the print parameters and the setting values indicated by the setting information do not coincide, and causes the UI 20 to display a message (arrow Q). The process at the arrow Q is an example of the displaying process.

Figure 4B:
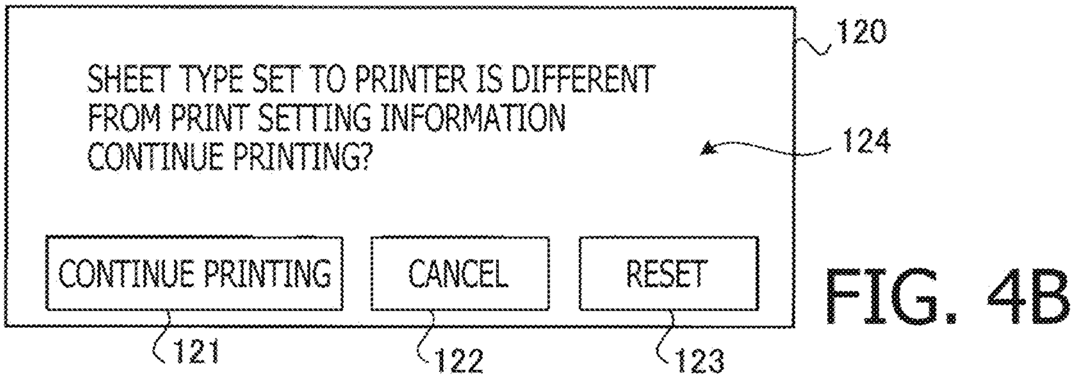

Specifically, for example, the supporting program 42 causes the UI 20 to display a dialogue 120 shown in FIG. 4B. The message 124 displayed on in the dialogue 120 notifies that the setting values of the print parameters and the setting values indicated by the setting information do not coincide (e.g., the setting of the sheet type is not adapted to the printer 2). In the dialogue 120, a "continue printing" button 121 for instructing to continue printing, a "cancel" button 122 for instructing to cancel printing and a "reset" button 123 for changing the print settings are also displayed.

For example, as shown in FIG. 5, when the user operates the "reset" button 123 through the UI 20 (arrow R), the supporting program 42 outputs a return notification to the general-use printing program 41 (arrow S). In response to the return notification, the general-use printing program 41 outputs an execution command again (arrows T and D). Due to the execution command, for example, a setting screen for setting the print parameters is displayed in the editing process by the supporting program 42. Since it is likely that the user changes the setting value of the print parameter indicating the sheet type from the "glossy paper" to the "standard paper" on this setting screen, it becomes less likely that the printer 2 executes printing that the user does not intend.

On the other hand, if the user operated the "continue printing" button 121 through the UI 20 (arrow R), the supporting program 42 executes the editing process (arrow K) and continues the printing (arrows K to N). Since the user permitted to execute printing on the standard paper through the dialogue 120, it is less likely that the user instructs to execute the printing again. That is, necessity of re-execution of printing can be suppressed.

Upon the user operates the "cancel" button 122 through the UI 20 (arrow R), the supporting program 42 outputs the cancel notification to the general-use printing program 41 (arrow H). The general-use printing program 41 aborts printing in response to the cancel notification (arrow I) and outputs the printing cancel notification to the editing APP 43 (arrow J). According to this configuration, outputs of print products that are not intended by the user can be suppressed.

It is noted that the processes at the arrows P and Q may be executed once for every receipt of the setting of the print parameters. Also, the timing for executing the processes at the arrows P and Q is not limited to the above-described timing but may be, for example, after the editing process, before the generation of the print data or after the generation of the print data.

Figure 6:
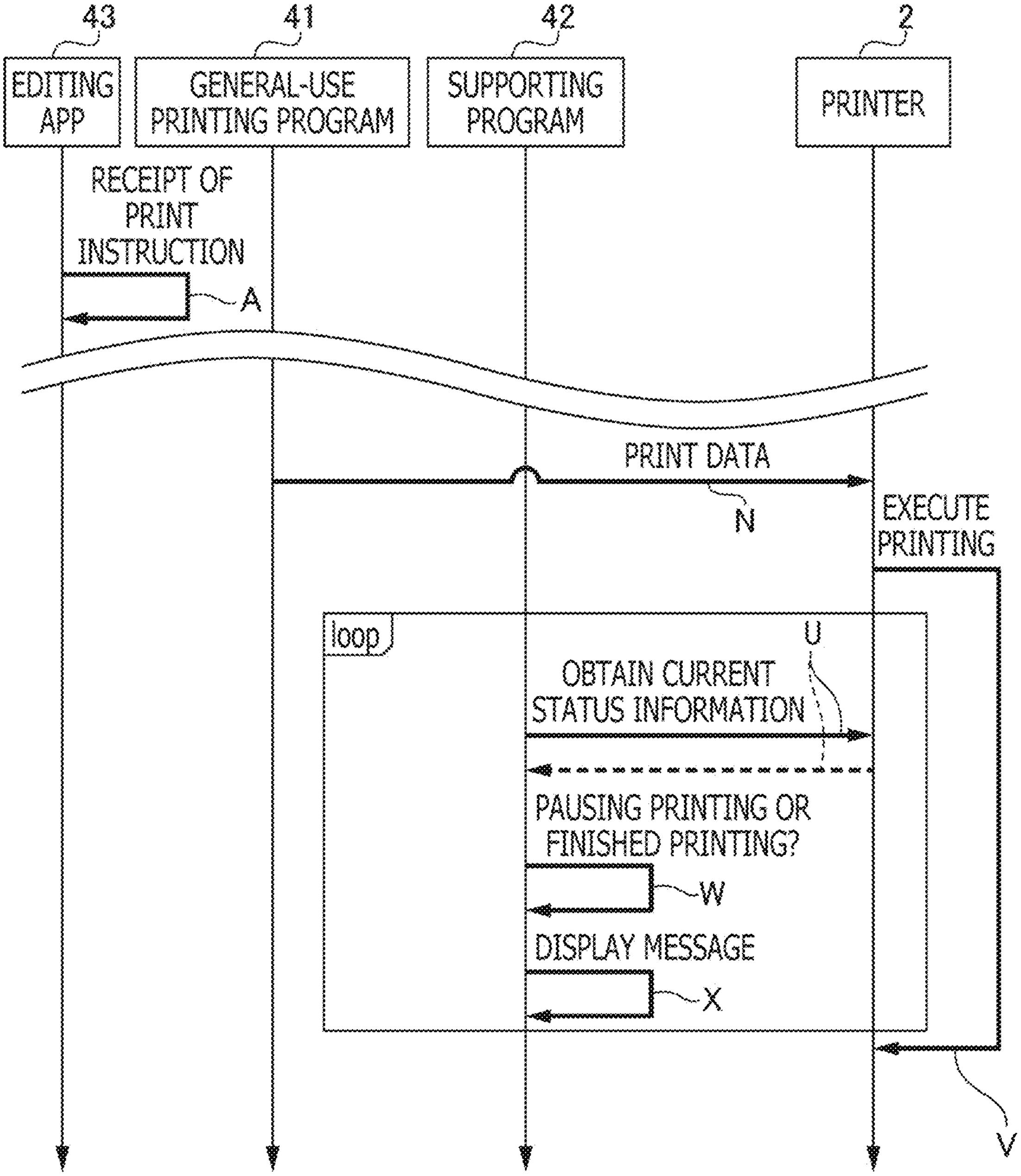
FIG. 6 is a sequential chart showing an example of an order of operations by respective programs.

As shown in FIG. 6, as the general-use printing program 41 generates print data in response to the end notification from the supporting program and transmits the print data to the printer 2 (arrow N), the printer 2 stores the print data in the internal memory and executes printing (arrow V). After outputting the end notification to the general-use printing program 41 (the arrow L shown in FIG. 5), the supporting program 42 periodically requests the current state information from the printer 2 and receives current state information returned from the printer 2 (arrow U). The supporting program 42 generates a list from the received current state information and stores the list in the memory 12.

The supporting program 42 determines whether the printer 2 satisfies the display condition based on the current state information from the printer 2, that is, for example, the supporting program 42 determines whether the job information indicates "pausing printing" or whether the current state information indicates "finished printing" (arrow W), and displays a message when the display condition is satisfied (arrow X). The arrow U is an example of the obtaining process, the arrow W is an example of the determining process, and the arrow X is an example of the displaying process. The determining condition at the arrow U is an example of the display condition.

By obtaining and updating the current state information at regular intervals, it becomes possible for the supporting program 42 to display a message based on the latest current state information. It is noted that, for example, the supporting program 42 may obtain the setting information from the printer 2 only once and display a message regarding the setting information when the general-use printing program 41 transmits the print data to the printer 2. Further, the supporting program 42 may obtain the current state information other than the setting information and display a message regarding the current state information other than the setting information at regular intervals. According to this configuration, communication load for periodically obtaining the current state information can be reduced.

For example, when the supporting program 42 received status information shown in FIG. 3B indicating "pausing printing" and "out of paper" from the printer 2, the supporting program 42 displays a message (arrow X).

Figure 4C:
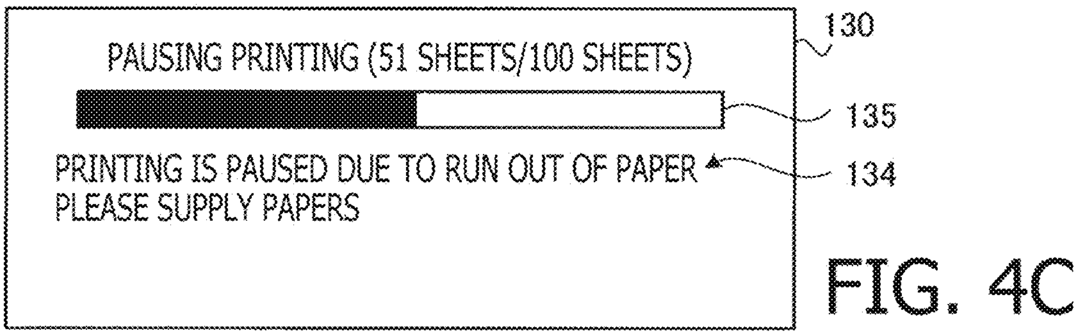

Specifically, for example, the supporting program 42 causes the UI 20 to display a dialogue 130 shown in FIG. 4C. In the dialogue 130, an error message 134 notifying that the printer 2 has paused printing, a content of an error and a method for resolving the error is displayed. In the dialogue 130, information 135 indicating a progress status of a print job is also displayed. It is noted that the error message 134 needs not include the content of an error and/or the method for resolving the error. Furthermore, the information 135 need not be displayed.

The printer 2 resumes printing upon papers are refilled. After resuming printing, the printer 2 returns the status information including information indicating "under printing" to the PC 1 in response to the request from the PC 1. The supporting program 42 determines that the error has been resolved as the job information changes from "pausing printing" to "under printing" and terminates the displaying of the dialogue 130. It is noted that, when a particular time period has elapsed since the displaying of the dialogue 130, the supporting program 42 may terminate the displaying of the dialogue 130.

If printing by the printer 2 is finished and the current state information includes job information indicating "finished printing", the supporting program 42 displays a message (arrow X), terminates the current state information monitoring process (a repetition of the arrows U-X), and terminates the displaying of the message after a particular time period has elapsed.

Figure 4D:
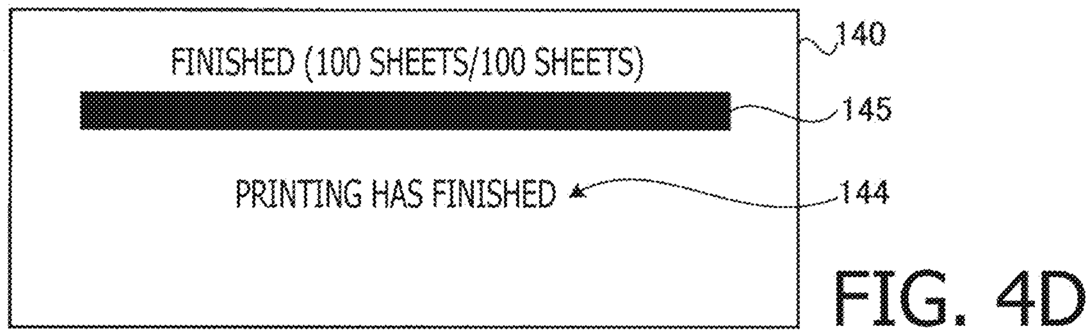

Specifically, for example, the supporting program 42 causes the UI 20 to display a dialogue 140 shown in FIG. 4D. In the dialogue 140, a finished printing message 144 notifying that printing has been finished and information 145 indicating a progress status of a print job are displayed. It is noted that the information 145 need not be displayed. After a particular time period has elapsed from the displaying of the dialogue 140, the supporting program 42 terminates the displaying of the dialogue 140. It is noted that the message notifying that printing has been finished may be displayed not only when printing has been normally finished but also when, for example, printing has been terminated in an anomalous state such as when forced termination is instructed through the operation part of the printer 2.

It is noted that, in the above-described displaying processes at the arrow F shown in FIG. 2, at the arrow Q shown in FIG. 5 and at the arrow X shown in FIG. 6, the messages may be displayed based on both the intrinsic information and the general-use information, or only messages based on the intrinsic information may be displayed without displaying messages based on the general-use information. This is because it is likely that the intrinsic information is important in executing a print job and thus it is likely that displaying of the messages is needed.

In case displaying of the error message or the finished printing message is to be terminated upon a particular time period has elapsed, the particular time period may be changed in accordance with the display condition. For example, when a message of a warning level, such as a message notifying that a print job cannot be executed due to, for example, run out of paper or paper jam, is displayed, the message may be displayed for a long time or until the error is resolved. Further, when a message of a cautioning level, such as a message notifying that a print job can be executed but will shortly become impossible to execute printing due to shortage in colorants, is displayed, the displaying of the message may be terminated in a short time.

The supporting program 42 may start periodically repeating the requests for the current state information (corresponding to the arrow O shown in FIG. 5 and the arrow U shown in FIG. 6) in response to the general-use printing program 41 receiving the print instruction for causing the printer 2 to execute printing (the arrow A shown in FIGS. 2, 5 and 6) or in response to receipt of the execution command from the general-use printing program 41 (the arrow D shown in FIGS. 2, 5 and 6). In this case, the supporting program 42 may execute the determinations at the arrow P shown in FIG. 5 and the arrow W shown in FIG. 6 based on the result of the periodic repeat of the requests. Furthermore, in this case, the supporting program 42 may terminate the periodic repeat of the requests for the current state information in response to the cancelling operation (the arrow H shown in FIGS. 2 and 5) or the finish of printing by the printer (the arrow X shown in FIG. 6).

As described above, the supporting program 42 obtains current state information of the printer 2 from the printer 2 and causes the UI 20 to display a message based on the obtained current state information when the current state information satisfies a display condition. According to such supporting program 42, the user can easily obtain current state information concerning a print job without operating the UI 20 of the OS 21 by confirming the message displayed on the UI 20.

It is noted that the present embodiment is only an illustrative example and is not intended to limit aspects of the present disclosures. Accordingly, the present disclosures can be modified or enhanced without departing from aspects of the disclosures. For example, the device connected to the PC 1 need not be limited to the printer but may be any device which has a printing function (e.g., an MFP, a copier, a facsimile machine and the like). Further, the number of printers connected to the PC 1 need not be limited to that in the illustrated example but may be one or three or more.

A module that executes each of the processes of the present embodiment is not limited to the supporting program 42 but may be a program that receives instructions form the OS 21 when executing printing using the general-use printing program 41 of the OS 21. For example, the module may be a print workflow app (i.e., Print workflow) of which specification is disclosed by Microsoft.

The supporting program 42 may delete the message displayed at the arrow X shown in FIG. 6 is response to an operation through the UI 20. The supporting program 42 may continue the periodic repeat of the requests for the current state information (the arrow U shown in FIG. 6) after displaying a message at the arrow X shown in FIG. 6, and when status information including job information different from "pausing printing" is received from the printer, that is, for example, when job information indicating "under printing" or "standby" is received, the supporting program 42 may automatically delete the message. According to this configuration, since information of which necessity to be displayed is low is deleted automatically, it becomes possible to suppress troublesomeness for the user.

At the arrow X shown in FIG. 6, the massage indicating that printing has been finished need not be displayed. Nonetheless, by displaying the massage indicating that printing has been finished, it becomes easier for the user to recognize the fact that printing has been finished which is useful for the user.

A cancel button may be provided to the dialogue 130 shown in FIG. 4C to make it possible for the user to cancel printing when an error occurred. In this case, since it becomes possible to execute a subsequent print job, usability of the print system improves. The information 135 or the information 145 shown in FIG. 4 may be displayed since receipt of the print instruction until the print job corresponding to the print instruction is finished.

In any of the sequential charts disclosed in the embodiment, the order of multiple processes at arbitrary multiple steps may be changed arbitrarily or may be executed in parallel unless there occurs conflicts in processing contents.

The processes disclosed in the present embodiment may be executed by a single CPU, a plurality of CPU's, hardware such as an ASIC or a combination thereof. Further, the processes disclosed in the present embodiment may be realized by various modes such as a non-transitory recording medium storing programs for executing the processes, methods for executing the processes and the like.

What is claimed is:

1. A non-transitory computer-readable recording medium for an information processing apparatus, the information processing apparatus having a controller, the recording medium containing computer-executable programs realizing a support application corresponding to a printing device connectable to the information processing apparatus, a general-use printing program being implemented in an operating system of the information processing apparatus, the general-use printing program being configured to perform printing without using a printer driver supplied by a vender of the printing device, wherein, in response to the general-use printing program receiving a print instruction to cause the printing device to execute printing of an image, the support application causes, when executed by the controller, the information processing apparatus to perform:

a print data obtaining process of obtaining first print data from the general-use printing program;

a print data transmitting process of transmitting second print data based on the first print data obtained in the print data obtaining process to the printing device;

a current state obtaining process of obtaining current state information indicating a current state of the printing device from the printing device through a communication interface of the information processing apparatus;

a displaying process of displaying a message screen on a display of the information processing apparatus according to the current state information obtained in the current state obtaining process, the message screen including a message according to the current state information and an operation button configured to receive a cancel operation of a print job corresponding to the print instruction;

a cancel receiving process of receiving the cancel operation of the print job by the operation button being operated; and a cancelling process of cancelling the print job in response to receiving the cancel operation.

2. The non-transitory computer-readable recording medium according to claim 1, wherein the message includes a content of an error and a method for resolving the error.

3. The non-transitory computer-readable recording medium according to claim 1, wherein the current state obtaining process is performed after the print data obtaining process is performed.

4. The non-transitory computer-readable recording medium according to claim 1, wherein the current state obtaining process is performed before the print data obtaining process is performed.

5. The non-transitory computer-readable recording medium according to claim 4, wherein the support application causes, when executed by the controller, the information processing apparatus to perform:

the current state obtaining process periodically after the print data transmitting process is performed.

6. An information processing apparatus having a communication interface, a display and a controller, wherein a general-use printing program is implemented in an operating system of the information processing apparatus, the general-use printing program being configured to perform printing without using a printer driver supplied by a vender of a printing device, wherein a support application corresponding the printing device connectable to the information processing apparatus is implemented in the information processing apparatus, wherein, in response to the general-use printing program receiving a print instruction to cause the printing device to execute printing of an image, the support application causes, when executed by the controller, the information processing apparatus to perform:

a print data obtaining process of obtaining first print data from the general-use printing program;

a print data transmitting process of transmitting second print data based on the first print data obtained in the print data obtaining process to the printing device;

a current state obtaining process of obtaining current state information indicating a current state of the printing device from the printing device through the communication interface of the information processing apparatus;

a displaying process of displaying a message screen on the display of the information processing apparatus according to the current state information obtained in the current state obtaining process, the message screen including a message according to the current state information and an operation button configured to receive a cancel operation of a print job corresponding to the print instruction;

a cancel receiving process of receiving the cancel operation of the print job by the operation button being operated; and a cancelling process of cancelling the print job in response to receiving the cancel operation.

7. The information processing apparatus according to claim 6, wherein the message includes a content of an error and a method for resolving the error.

8. The information processing apparatus according to claim 6, wherein the current state obtaining process is performed after the print data obtaining process is performed.

9. The information processing apparatus according to claim 6, wherein the current state obtaining process is performed before the print data obtaining process is performed.

10. The information processing apparatus according to claim 9, wherein the support application causes, when executed by the controller, the information processing apparatus to perform:

the current state obtaining process periodically after the print data transmitting process is performed.

* * * * *